(12) United States Patent
Sugawara

(10) Patent No.: US 12,194,541 B2
(45) Date of Patent: Jan. 14, 2025

(54) METHOD FOR PRODUCING SILVER POWDER

(71) Applicant: DOWA ELECTRONICS MATERIALS CO., LTD., Tokyo (JP)

(72) Inventor: Satoko Sugawara, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 18/681,169

(22) PCT Filed: Sep. 9, 2022

(86) PCT No.: PCT/JP2022/033969
§ 371 (c)(1),
(2) Date: Feb. 5, 2024

(87) PCT Pub. No.: WO2023/042771
PCT Pub. Date: Mar. 23, 2023

(65) Prior Publication Data
US 2024/0278325 A1  Aug. 22, 2024

(30) Foreign Application Priority Data
Sep. 14, 2021 (JP) .................. 2021-149719

(51) Int. Cl.
*B22F 1/102* (2022.01)
*B22F 1/054* (2022.01)
(Continued)

(52) U.S. Cl.
CPC ............... *B22F 9/24* (2013.01); *B22F 1/056* (2022.01); *B22F 1/102* (2022.01); *B22F 1/145* (2022.01);
(Continued)

(58) Field of Classification Search
CPC ... H01B 1/02; B22F 1/05; B22F 1/102; B22F 1/105; B22F 1/16; B22F 9/18
See application file for complete search history.

(56) References Cited

U.S. PATENT DOCUMENTS 9,984,788 B2 * 5/2018 Michiaki ......... H01L 31/022425
2005/0279970 A1 * 12/2005 Ogi ........................ B22F 9/24
252/514

FOREIGN PATENT DOCUMENTS

| JP | 2006-002228 | 1/2006 |
| JP | 2011-068932 | 4/2011 |
| WO | 2017/183624 | 10/2017 |

OTHER PUBLICATIONS

English language translation of ISR237 (mail date Nov. 1, 2022).*
(Continued)

*Primary Examiner* — Mark Kopec
(74) *Attorney, Agent, or Firm* — Bauer & Joseph

(57) ABSTRACT

A method for producing a silver powder enables a low resistance when the silver powder is made into a paste to form an electrode without changing the type of surface treatment agent. A silver powder, which enables an electrode to have a low resistance when the silver powder is made into a paste to form the electrode, is obtained by adding an O/W-type emulsion containing micelles of a surface treatment agent having a volume-based cumulative 50% particle diameter $D_{50}$ obtained by a laser diffraction particle size distribution analysis of 1.5 μm or less to a slurry of a silver powder. The surface of the silver powder is coated with the surface treatment agent. The surface of the silver powder is further coated with a polyvalent carboxylic acid in a step of producing the silver powder.

6 Claims, 2 Drawing Sheets

(51) Int. Cl.
*B22F 1/145* (2022.01)
*B22F 9/24* (2006.01)
*C09C 1/62* (2006.01)
*C09C 3/08* (2006.01)
*H01B 1/02* (2006.01)

(52) U.S. Cl.
CPC .................. *C09C 1/62* (2013.01); *C09C 3/08* (2013.01); *B22F 2301/255* (2013.01); *B22F 2304/056* (2013.01); *B22F 2998/10* (2013.01); *C01P 2006/40* (2013.01)

(56) References Cited

OTHER PUBLICATIONS

Lin et al "Effects of surfactant treatment of silver powder on the rheology of its thick-film paste", Materials Chemistry and Physics 45 (1996) 136-144.*
Hong et al "Preparation of Well-Dispersed Silver Nanoparticles for Oil-Based Nanofluids", Ind. Eng. Chem. Res. 2010, 49, 1697-1702.*
Dong et al "Synthesis of stearic acid-stabilized silver nanoparticles in aqueous solution", Advanced Powder Technology 27 (2016) 2416-2423.*
Zhang et al "Sonication synthesis of micro-sized silver nanoparticle/ oleic acid liquid marbles: A novel SERS sensing platform", Sensors and Actuators B 223 (2016) 52-58.*

* cited by examiner

[Fig.1]
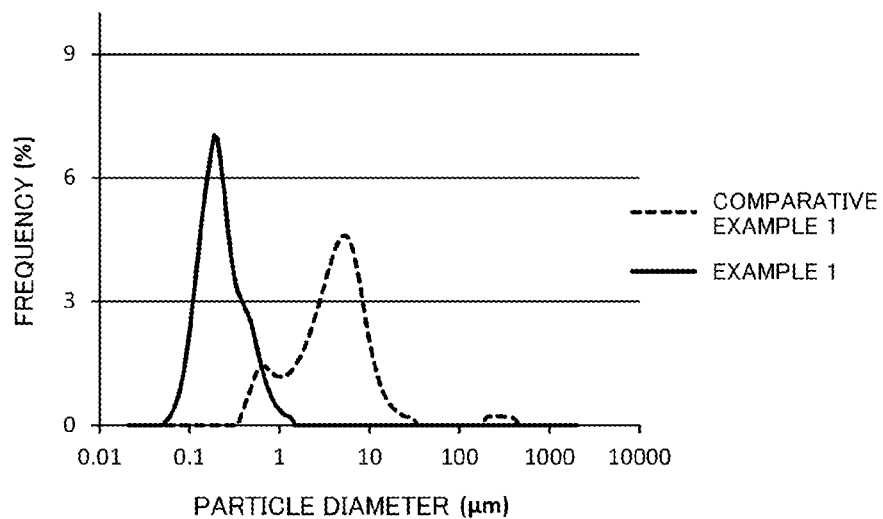
[Fig.2]
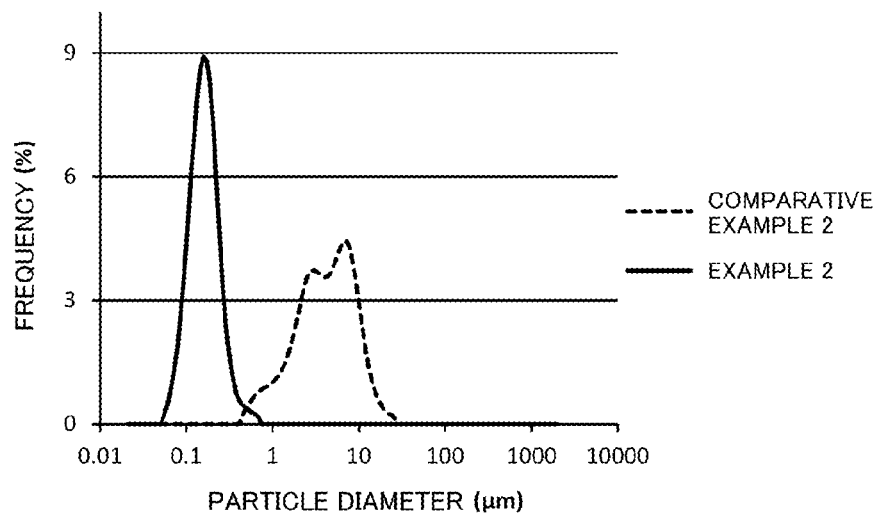

[Fig.3]
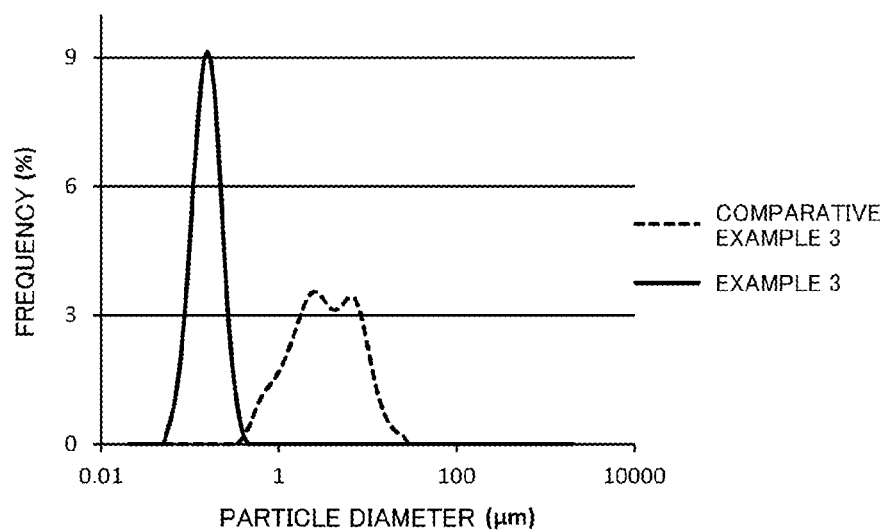

METHOD FOR PRODUCING SILVER POWDER

TECHNICAL FIELD

The present invention relates to a method for producing a silver powder, and more particularly relates to a method for producing a silver powder suitable for use in an electrically conductive paste for forming an electrical conduction path in an element such as an electrode or a circuit of various electronic components.

BACKGROUND ART

Conventionally, in the formation of an electrode, a circuit, or the like of an electronic component, a resin-type or firing-type silver paste is often used. In recent years, for an electrically conductive paste using a silver powder, an increase in the density of conductor patterns or formation of a finer line such that the thickness of a wire is reduced due to miniaturization of an electronic component is required. Further, also in order to improve the power generation efficiency by increasing the light collecting area of a solar cell, a finger electrode is required to be thinned. If coarse particles are present in the silver powder contained in the silver paste, a plate may be clogged when a pattern is formed by printing, which causes disconnection of a circuit, and therefore, as the silver powder for an electrically conductive paste, a silver powder containing no coarse particles has been demanded.

Further, in the formation of an electrode for a solar cell, since the electrical conductivity of the electrode leads to improvement of the conversion efficiency, there is also a demand for improving the electrical conductivity of an electrode formed using a resin curing-type electrically conductive paste.

As a method for producing a silver powder for an electrically conductive paste, for example, PTL 1 discloses a method for producing a silver powder having excellent low-temperature sinterability, in which formalin that is a reducing agent is added to an aqueous solution containing a silver-ammine complex, and thereafter, an emulsion of stearic acid that acts as a dispersant for a reduced and deposited silver powder is added thereto, thereby obtaining a silver powder.

CITATION LIST

Patent Literature

PTL 1: JP2006-002228A

SUMMARY OF INVENTION

Technical Problem

In the method for producing a silver powder disclosed in PTL 1, in order to improve the dispersibility of the reduced and deposited silver powder, the silver powder is surface-treated with stearic acid which is a dispersant, and the stearic acid is added in an emulsion state. In the production method disclosed in PTL 1, the reason why a fatty acid such as stearic acid which is a surface treatment agent is added in an emulsion state is that the fatty acid has a high melting point and is poorly soluble in water, and it is difficult to uniformly disperse it as it is in an aqueous solution in which the silver powder is dispersed. Therefore, the fatty acid is emulsified in advance, that is, an emulsion in which fine micelles of the fatty acid are dispersed in water is formed, and the emulsion is added to the slurry containing the silver powder.

However, it was found that in the production method disclosed in PTL 1, generation of coarse silver secondary particles cannot be completely prevented.

The sinterability of a silver paste is greatly affected by the surface state of a silver powder, particularly a surface treatment agent adhered to the surface of a silver powder. Further, it is also necessary to change the combination of an organic solvent, an organic resin binder, and various additives forming a silver paste when changing the surface treatment agent adhered to the surface of a silver powder. Therefore, it is desired to improve the dispersibility of a silver powder, resulting in preventing the generation of coarse silver powder particles without changing the type of surface treatment agent.

In this regard, the present inventor has found that the dispersibility of a silver powder in a slurry containing a reduced and deposited silver powder is improved by reducing the particle diameter of micelles of a surface treatment agent contained in an emulsion of the surface treatment agent, and has been filed as Japanese Patent Application No. 2021-047972.

However, an electrically conductive film formed using silver particles obtained by the production method disclosed in Japanese Patent Application No. 2021-047972 has a lower volume resistivity than an electrically conductive film obtained using a conventional silver powder, but it was not always sufficient to meet the demand for the electrical conductivity required in recent years.

A technical problem to be solved in the invention is to provide a method for producing a silver powder which enables a low resistance when a silver powder obtained is made into a paste to form an electrode without changing the type of the surface treatment agent for the silver powder from a conventional one.

Solution to Problem

As a result of intensive studies to achieve the above-mentioned object, the present inventor found that when the particle diameter of micelles of a surface treatment agent contained in an emulsion of the surface treatment agent to be added in a step of producing a silver powder is reduced, and also the surface of a silver powder coated with the surface treatment agent by adhering the surface treatment agent using the emulsion is further coated with a polyvalent carboxylic acid, a low resistance is achieved when the silver powder coated with the polyvalent carboxylic acid is made into a paste to form an electrode.

Based on the above-mentioned finding, the present inventor completed the invention described below.

That is, in order to achieve the above-mentioned object, the invention provides (1) a method for producing a silver powder, in which silver ions are converted into a silver complex with a complexing agent and the silver complex is reduced, thereby obtaining a silver powder, including:
 a silver complexing step of forming a silver-ammine complex aqueous solution using ammonium ions as the complexing agent for complexing the silver ions;
 a reduction step of reducing the silver complex with a reducing agent by adding the reducing agent to the aqueous solution containing the silver complex, thereby obtaining a slurry of a silver powder;

an emulsion addition step of adding an O/W-type emulsion containing micelles of a surface treatment agent having a volume-based cumulative 50% particle diameter $D_{50}$ obtained by a laser diffraction particle size distribution analysis of 1.5 µm or less to the slurry of the silver powder, thereby treating the surface of the silver powder; and a carboxylic acid coating step of coating the silver powder coated with the surface treatment agent in the emulsion addition step with a polyvalent carboxylic acid.

(2) In the production method of the above (1), it is preferred that the polyvalent carboxylic acid is one type or two or more types selected from the group consisting of adipic acid, succinic acid, diglycolic acid, glutaric acid, and maleic acid.

(3) In the production method of the above (1) or (2), it is preferred that the surface treatment agent contained in the emulsion is a fatty acid having 8 or more carbon atoms in a straight chain.

(4) In the production methods of the above (1) to (3), it is preferred that the surface treatment agent contained in the emulsion is a long-chain fatty acid having 12 or more carbon atoms.

(5) In the production methods of the above (1) to (4), as the surface treatment agent contained in the emulsion, one type or two types selected from the group consisting of palmitic acid and stearic acid can be used.

(6) In the production methods of the above (1) to (4), as the surface treatment agent contained in the emulsion, linoleic acid or linolenic acid can be used.

Advantageous Effects of Invention

Use of the production method of the invention can provide a silver powder which enables a low resistance when the silver powder is made into a paste to form an electrode without changing the type of surface treatment agent for the silver powder.

BRIEF DESCRIPTION OF DRAWINGS

FIG. 1 is a graph comparing the measurement results of the particle size distribution of micelles contained in emulsions obtained in Example 1 and Comparative Example 1.

FIG. 2 is a graph comparing the measurement results of the particle size distribution of micelles contained in emulsions obtained in Example 2 and Comparative Example 2.

FIG. 3 is a graph comparing the measurement results of the particle size distribution of micelles contained in emulsions obtained in Example 3 and Comparative Example 3.

DESCRIPTION OF EMBODIMENTS

[Starting Material]

In the method for producing a silver powder of the invention, an aqueous solution in which a silver complex is formed by adding a complexing agent to an aqueous solution containing silver (1) ions is used as a starting material. As a supply source of the silver ions, an industrially used known inorganic silver salt such as silver(1) nitrate, silver(1) sulfate, silver(1) carbonate, silver(1) chloride, or silver(1) oxide can be used.

In the invention, although not particularly specified, the concentration of silver ions in the aqueous solution is preferably 0.1 mass % or more and 10 mass % or less at a stage before the addition of the below-mentioned reducing agent. It is not preferred that the concentration of silver ions is less than 0.1 mass % because the amount of the silver powder that can be produced in one reaction is reduced. It is also not preferred that the concentration of silver ions exceeds 10 mass % because the viscosity of the reaction solution after deposition of silver particles increases, and the reaction solution may not be able to be uniformly stirred.

[Complexing Agent]

As the complexing agent for silver ions, ammonium ions such as ammonia water or an ammonium salt, or a chelate compound such as a salt of ethylenediaminetetraacetic acid (EDTA) can be used, but it is preferred to use ammonium ions, which easily form a complex with silver ions, are easily washed away, and are less likely to leave impurities. When ammonium ions are used as the complexing agent, a silver-ammine complex is formed in the aqueous solution. In this case, the coordination number of the ammine complex is 2, and therefore, 2 or more moles of ammonium ions are added per mole of silver ions.

[Complexation Aid]

As an additive for assisting the formation of the silver complex, an azole such as benzotriazole or a salt thereof, or an oxycarboxylic acid such as citric acid may be added before adding the below-mentioned reducing agent.

[Reducing Agent]

In the method for producing a silver powder of the invention, in order to reduce the silver complex to deposit silver in a metallic state, a known reducing agent can be used. Examples of the reducing agent include formalin, ascorbic acid, hydrazine, alkanolamine, hydroquinone, oxalic acid, formic acid, aldehydes, alcohols, organic substances such as saccharides, lower oxides of metals, and sodium borohydride, and it is preferred to use one or more types of ascorbic acid, glucose, formaldehyde, hydrazine, and hydrazine carbonate, whose reactivity is stable to some extent, and which can rapidly reduce silver, and among them, it is preferred to use formaldehyde, hydrazine, or hydrazine carbonate.

The addition amount of the reducing agent is preferably 1 equivalent or more with respect to silver in order to increase the yield of silver, and may be 2 equivalents or more, for example, 10 to 20 equivalents with respect to silver when a reducing agent having a low reducing power is used.

As the method of adding the reducing agent, in order to prevent the aggregation of the reduced and deposited silver powder, it is preferred to add the reducing agent at a rate of 1 equivalent/min or more with respect to the amount of silver ions. Further, during reduction, it is preferred to stir the silver-ammine complex aqueous solution and the reaction solution after silver particles are deposited, from before the addition of the reducing agent until the completion of the reduction deposition step. Further, the temperature when the reducing agent is added to reduce and deposit the silver particles is preferably 5° C. or higher and 80° C. or lower, and more preferably 5° C. or higher and 40° C. or lower.

[Surface Treatment Agent]

In the method for producing a silver powder of the invention, in order to improve the dispersibility of the reduced and deposited silver powder, the silver powder is treated with a surface treatment agent. As the surface treatment agent, a hydrophobic dispersant is preferred, and a fatty acid or a salt thereof can be used. Use of a fatty acid or a salt thereof can achieve both adsorption of the surface treatment agent to silver and dispersibility of silver particles. Examples of the fatty acid (the number of carbon atoms in parentheses) include propionic acid (3), caprylic acid (8), lauric acid (12), myristic acid (14), palmitic acid (16), stearic acid (18), behenic acid (22), acrylic acid (3), oleic acid (18), linoleic acid (18), linolenic acid (18), and arachidonic acid (20), and in the invention, it is preferred to use a fatty acid having 8 or more carbon atoms in a straight chain, it is more preferred to use a long-chain fatty acid having 12 or more carbon atoms, it is further more preferred to use a long-chain fatty acid having 16 or more carbon atoms, and the number of carbon atoms is more preferably 20 or less. As the surface treatment agent, it is particularly preferred to use one type or two types of palmitic acid (melting point: 62.9° C.) and stearic acid (melting point: 69.6° C.). Further, linoleic acid and linolenic acid are particularly preferred in terms of reducing the viscosity when forming a paste.

This is because a fatty acid having less than 8 carbon atoms has water solubility and therefore has little need to be emulsified, and also the adsorption of the surface treatment agent to silver is weak. This is because by setting the number of carbon atoms to 12 or more, it is easy to obtain dispersibility required for the silver powder. Palmitic acid and stearic acid are easy to obtain. This is because if the number of carbon atoms exceeds 20, it becomes difficult to adjust the viscosity or the like when forming a paste. Note that a fatty acid exemplified above available on the market may contain another fatty acid. For example, in a stearic acid reagent, the amount of stearic acid is usually not 100 mass %, and another fatty acid that is difficult to separate in the production process is usually also contained. Therefore, the above-mentioned fatty acid to be used for emulsification may be one containing the fatty acid as a main component in an amount of 50 mass % or more (also referred to as a purity of 50% or more) in a GC-MS analysis, and may contain another fatty acid other than the main component.

[Emulsion]

Many of the above-mentioned fatty acids to be used as the surface treatment agent are a solid at room temperature and are also poorly soluble in water, and therefore are emulsified in advance and added in a state of being converted into a liquid to the slurry of the reduced and deposited silver powder to adhere the surface treatment agent to the surfaces of the silver particles. Further, it is preferred to use a surfactant at the time of emulsification. Examples of the surfactant include RHEODOL TW-P120, EMULGEN 350, and EMULGEN 120 of Kao Corporation. In the emulsification, the fatty acid forms micelles and is dispersed in the form of fine liquid droplets in the aqueous solution.

The concentration of the fatty acid in the emulsion is preferably 0.1 mass % or more and less than 50 mass %. Then, the concentration of the fatty acid in the emulsion in a diluted state in the same manner as when it is added into the aqueous solution in the production of the silver powder is set to preferably 0.1 mass % or more and 5 mass % or less, and more preferably 1 mass % or more and 5 mass % or less.

The method for producing a silver powder of the invention is characterized in that the volume-based cumulative 50% particle diameter $D_{50}$ of the micelles that are contained in the emulsion prepared in advance and that contain the fatty acid and the surfactant is set to 1.5 µm or less. The cumulative 50% particle diameter $D_{50}$ is preferably 1.0 µm or less, the cumulative 50% particle diameter $D_{50}$ is more preferably 0.7 µm or less, and further more preferably 0.4 µm or less in order to enhance the effect of reducing coarse particles. In the invention, the lower limit of the cumulative 50% particle diameter $D_{50}$ of the micelles is not particularly specified, but is, for example, 1 nm or more. A method for measuring the cumulative 50% particle diameter $D_{50}$ of the micelles will be described later.

The volume-based cumulative 50% particle diameter $D_{50}$ of the micelles contained in the commercially available stearic acid emulsion described in PTL 1 was measured and found to be 4.0 µm. In the method for producing a silver powder of the invention, a reduction in the particle diameter of the micelles as compared with the conventional one increases a speed at which the emulsion containing the surface treatment agent is dispersed in the slurry containing the silver powder when the emulsion is added into the slurry, and can uniformly adhere the surface treatment agent to the surfaces of the silver particles in the slurry, so that the ability to prevent the aggregation of the silver particles is improved. In addition, it is considered that also when the silver powder is made into an electrically conductive paste, as compared with the case where a conventional surface treatment agent with a large size is adhered to the surfaces of the silver particles, in the case where the surface treatment agent with a small size is adhered thereto, the compatibility with a solvent, a resin, an additive, or the like to be used in the electrically conductive paste becomes better, resulting in leading to a reduction in the resistance of an electrode obtained using the electrically conductive paste.

[Method for Preparing Emulsion]

Specific examples of a method for preparing the above-mentioned emulsion include the following three methods.

(1) A commercially available emulsion in which the volume-based cumulative 50% particle diameter $D_{50}$ of micelles of a surface treatment agent is 2 µm or more (original emulsion: Selosol 920 manufactured by Chukyo Yushi Co., Ltd. satisfies this condition) is used as a starting material and heated to a temperature, which is equal to or higher than the melting point of the surface treatment agent contained in the emulsion and is also equal to or higher than a temperature at which a surfactant separates from the surface treatment agent, and stirred by a known stirring means, and then cooled after the volume-based cumulative 50% particle diameter $D_{50}$ of the micelles of the surface treatment agent reaches 1 µm or less. In this case, it is preferred to use a homogenizer as the stirring means.

(2) A commercially available emulsion in which the volume-based cumulative 50% particle diameter $D_{50}$ of micelles of a surface treatment agent is 2 µm or more (original emulsion) is used as a starting material and maintained at a temperature, which is lower than the melting point of the surface treatment agent contained in the emulsion, and at which a surfactant separates from the surface treatment agent, for 1 minute or more, and heated to a temperature equal to or higher than the melting point of the surface treatment agent after checking that a solid of the surface treatment agent is generated in the liquid, and stirred by a known stirring means, and then cooled after the volume-based cumulative 50% particle diameter $D_{50}$ of the micelles of the surface treatment agent reaches 1 µm or less. In this case, it is preferred to use a homogenizer as the stirring means.

Note that the preparation method described in (2) makes it possible to obtain an emulsion in which the micelles have a smaller particle diameter.

(3) A surfactant is added to a fatty acid which is the above-mentioned surface treatment agent, the respective materials are melted at a temperature equal to or higher than the respective melting points, and thereafter, boiling water is added thereto so as to prevent solidification, and the resulting mixture is stirred by a known stirring means, and then cooled after the volume-based cumulative 50% particle diameter $D_{50}$ of micelles of the surface treatment agent reaches 1 µm or less. In this case, it is preferred to use a homogenizer as the stirring means.

When the surface treatment agent such as a fatty acid is emulsified, micelles are formed by binding the fatty acid to the surfactant. The temperature at which a nonionic surfactant that forms micelles by binding to a surface treatment agent separates from the surface treatment agent is called a cloud point. Here, the temperature at which the nonionic surfactant separates from the surface treatment agent is a temperature at which the surface treatment agent whose bond to the nonionic surfactant is cleaved begins to be observed (in the following Example 2, the temperature at which a solid of the fatty acid begins to appear) when the temperature of the emulsion is raised. In the case of the above-mentioned surfactant, the cloud point is about 30 to 80° C., and the cloud point of Selosol in the following Examples is 60° C.

As the homogenizer, a commercially available one can be used. A homogenizer that has a structure in which a tip of a shaft is formed of a fixed outer blade and a rotating inner blade, and that can carry out pulverization and homogenization by the effect of ultrasonic waves, high frequencies, or the like occurring between the inner blade and the window of the outer blade is preferred, and for example, a biomixer (model: BM-4) manufactured by Nihonseiki Kaisha, Ltd., or the like can be used.

The conditions of stirring using the homogenizer described above depend on the amount of the emulsion to be treated, but for example, the rotation speed of the inner blade of the homogenizer with respect to 50 mL of the emulsion liquid amount is set to preferably 7,000 rpm or more, and more preferably 10,000 rpm or more. Further, the stirring time using the homogenizer is set to preferably 10 seconds or more, and more preferably 1 minute or more. This is because the smaller the amount of stirring (rotation speed× time) with respect to the liquid amount is, the more difficult it is to reduce the particle diameter of the micelles.

Further, as the above-mentioned cooling method, a general cooling method may be used, and for example, cooling may be performed to room temperature or the liquid temperature of the slurry containing the silver particles in the method for producing a silver powder described later by allowing the emulsion to cool at room temperature or by performing gradual cooling using the temperature adjustment function of a hot bath or water cooling.

[Method for Measuring Particle Size Distribution of Micelles Contained in Emulsion]

The particle size distribution of the micelles of the surface treatment agent contained in the emulsion is measured using a laser diffraction particle size distribution analyzer (for example, Microtrac MT3300 EXII manufactured by Nikkiso Co., Ltd.). As a dispersion medium, pure water is used, and the volume-based particle size distribution is measured. The volume-based cumulative 10% particle diameter ($D_{10}$), cumulative 50% particle diameter ($D_{50}$), cumulative 90% particle diameter ($D_{90}$), and cumulative 95% particle diameter ($D_{95}$), and the maximum particle diameter ($D_{max}$) automatically calculated in the analyzer are used. The steepness of the particle size distribution is evaluated based on the ($D_{90}-D_{10}$)/$D_{50}$ ratio.

In the measurement of the particle size distribution, it is preferred to measure the emulsion diluted with pure water at the same dilution ratio (for example, 10 times) as when it is added into the aqueous solution in the production of a silver powder described below.

[Method for Producing Silver Powder]

In the embodiment of the method for producing a silver powder of the invention, ammonium ions are added to an aqueous solution containing silver ions, thereby forming a silver-ammine complex (silver complexing step), and a reducing agent is added to the obtained silver-ammine complex aqueous solution, thereby reducing and depositing silver particles (reduction step). After the silver particles are reduced and deposited with the reducing agent, an emulsion in which the volume-based cumulative 50% particle diameter $D_{50}$ of micelles of a surface treatment agent is 1.5 μm or less is added into a slurry containing the silver particles, thereby adhering the surface treatment agent to the surfaces of the silver particles (emulsion addition step).

The amount of the fatty acid contained in the emulsion to be added is preferably 0.1 mass % or more and 1.2 mass % or less with respect to the amount of silver in the silver-ammine complex aqueous solution. When the amount of the fatty acid is less than 0.1 mass % with respect to the amount of silver, the frequency of occurrence of coarse silver particles may increase. Further, also when the amount of the fatty acid exceeds 1.2 mass % with respect to the amount of silver, the frequency of occurrence of coarse silver particles may increase. More preferably, the amount of the fatty acid contained in the emulsion to be added is 0.1 mass % or more and 1.0 mass % or less, and more preferably 0.8 mass % or less with respect to the amount of silver in the silver-ammine complex aqueous solution.

The reducing agent need only be a reducing agent that reduces and deposits silver particles, and as described above, one or more types of ascorbic acid, glucose, formaldehyde, hydrazine, and hydrazine carbonate can be used, and it is preferred to use formaldehyde, hydrazine, or hydrazine carbonate.

It is preferred that after the silver particles are reduced and deposited, the silver-containing slurry containing the silver particles surface-treated by adding the emulsion containing the micelles of the surface treatment agent is subjected to solid-liquid separation, and the obtained solid material is washed with pure water to remove impurities in the solid content. The end point of this washing can be determined based on the electrical conductance of water after washing. Preferably, washing is performed until the electrical conductivity of water after washing reaches 0.5 mS/m or less.

A block-shaped cake obtained after washing contains much water, and therefore, it is preferred to obtain a dried silver powder by a dryer such as a vacuum dryer. At this time, in order to prevent sintering of the silver particles at the time of drying, the drying temperature is preferably 100° C. or lower. Further, the obtained silver powder may be subjected to a dry crushing treatment or a classification treatment. Here, the dry crushing treatment is a crushing treatment that is performed for the purpose of crushing aggregates of a silver powder in which particles are aggregated together during drying. The crushing method is not particularly limited and can be appropriately selected according to the purpose, but it is preferred to use a crusher that carries out crushing and allows the powder to flow by rotating a stirring blade, and for example, a Henschel mixer, a sample mill, a blender, a coffee mill, or the like is used. The rotation speed and time, and the processing count are appropriately set so that the powder is not heated as much as possible. Note that when the dry crushing treatment is performed, the treatment may also serve as a carboxylic acid coating step, which will be described later.

[Carboxylic Acid Coating Step]

In the production method of the invention, the silver powder coated with the surface treatment agent obtained in the emulsion addition step is further coated with a polyvalent carboxylic acid. The reason why the resulting electrode has low resistance when forming an electrode by making a paste of silver powder coated with a polyhydric carboxylic acid is not exactly known at present. However, the present inventor presumes that the adhesion of a polyvalent carboxylic acid to the surface of the silver powder promotes the volumetric shrinkage between silver powder particles during heat curing and can enhance the contactability between silver powder particles.

Specific embodiments of the polyvalent carboxylic acid coating are exemplified below, but embodiments of the polyvalent carboxylic acid coating in the invention are not limited thereto.

(1) A polyvalent carboxylic acid dissolved in an air-dryable solvent is added and mixed when the silver powder is subjected to a dry crushing treatment.

(2) After washing the silver powder, a polyvalent carboxylic acid is added and mixed with the silver powder in a state before drying, and then, the resulting mixture is dried.

(3) A polyvalent carboxylic acid and pure water or an alcohol are added to the silver powder after drying to form a slurry, and the slurry is wet crushed and then dried.

Among the above-mentioned three embodiments, it is preferred to use dry crushing in (1) from the viewpoint of preventing deterioration of the polyvalent carboxylic acid due to the heating temperature when drying moisture or the like.

[Polyvalent Carboxylic Acid]

The most important technical feature of the production method of the invention is that a silver powder is coated with a polyvalent carboxylic acid containing two or more carboxyl groups. Examples of the polyvalent carboxylic acid include adipic acid, succinic acid, diglycolic acid, glutaric acid, and maleic acid. In particular, it is preferred to use adipic acid which has an effect of lowering the volume resistivity when it is added in a small amount.

The amount of the polyvalent carboxylic acid with which the silver powder is coated is preferably 0.01 mass % to 0.5 mass %, more preferably 0.02 mass % to 0.4 mass % with respect to the mass of the material silver powder. This is because when the amount of the polyvalent carboxylic acid added is out of the range of 0.01 mass % to 0.5 mass % with respect to the mass of the material silver powder, the effect of improving the electrical conductivity of the electrically conductive film to be produced is not sufficiently obtained.

When the polyvalent carboxylic acid is added to the material silver powder for coating, in one embodiment, the polyvalent carboxylic acid is added in a state of being dissolved in a solvent to the material silver powder. The concentration of the polyvalent carboxylic acid dissolved at this time is preferably 1 mass % to 20 mass %. This is because when the dissolved concentration of the polyvalent carboxylic acid is less than 1 mass %, the amount of the solution is large and the solution is unevenly distributed during drying to remove the solvent, and the material silver powder may not be able to be uniformly coated with the polyvalent carboxylic acid. Further, when the dissolved concentration exceeds 20 mass %, the amount of the solution becomes too small, and the material silver powder may not be able to be uniformly coated with the polyvalent carboxylic acid.

In addition, the solvent for dissolving the polyvalent carboxylic acid need only be able to dissolve the polyvalent carboxylic acid. In the above-mentioned embodiment (1), a solvent that can be evaporated at normal temperature (air dryable) and is volatile with a boiling point of 83° C. or lower is preferred because it is easy to remove the solvent after coating. Examples thereof include alcohols, acetone, and ethers such as methyl ethyl ether and ethyl ether. In the above-mentioned embodiment (1), it is more preferred to select the type and amount of the solvent so that the silver powder coated with the polyvalent carboxylic acid is in a dry state after the dry crushing treatment is completed.

The material silver powder to which the polyvalent carboxylic acid has been added is preferably subjected to dry crushing so that the material is uniformly coated with the polyvalent carboxylic acid. The dry crushing is performed by putting the material silver powder to which the polyvalent carboxylic acid has been added, for example, in a Henschel mixer, a sample mill, a blender, a coffee mill, or the like. Then, if necessary, the solvent used for adding the polyvalent carboxylic acid is evaporated by frictional heat generated by crushing or by a drying step. As a result, the material silver powder coated with the polyvalent carboxylic acid is obtained. When the silver powder coated with the surface treatment agent in the emulsion addition step is further coated with the polyvalent carboxylic acid, although the state of adhesion thereof to silver on the surface of the silver powder is not clear, it is considered that the surface treatment agent and the polyvalent carboxylic acid are in a coexisting state on the silver surface.

[Measurement of Particle Size Distribution]

The particle size distribution of the silver powder is measured using a laser diffraction particle size distribution analyzer (Microtrac MT3300 EXII manufactured by Nikkiso Co., Ltd.) after crushing is performed using a sample mill SK-M10 manufactured by Kyoritsu Riko Co., Ltd., and 0.1 g of the silver powder is dispersed in isopropyl alcohol (IPA), followed by stirring for 2 minutes using an ultrasonic homogenizer (model: US-150T) manufactured by Nihonseiki Kaisha, Ltd.

[Measurement of Specific Surface Area]

As the specific surface area of the silver powder, a specific surface area measured by a BET method is used. In the measurement of the specific surface area by a BET method, a specific surface area meter that realizes the measurement may be used. In the present embodiment, a value measured using a Macsorb HM-model 1210 manufactured by Mountec Corporation as the specific surface area meter by a BET method is used. In the present embodiment, in the measurement of the specific surface area, a value measured by a BET one-point method after degassing by allowing a He—$N_2$ mixed gas (nitrogen: 30%) to pass through the meter at 60° C. for 10 minutes is used.

[Method for Producing Silver Paste]

A total of 92.6 mass % of a silver powder containing a silver powder obtained in each of the below-mentioned Examples and Comparative Examples and a flake silver powder (FA-S-20 manufactured by DOWA Hightech Co., Ltd.) at a ratio of 4 to 6, 4.88 mass % of an epoxy resin, 0.24 mass % of a curing agent (a boron trifluoride monoethylamine complex manufactured by Wako Pure Chemical Industries, Ltd.), and 2.28 mass % of a solvent (BCA: butyl carbitol acetate) are mixed by stirring at 1,200 rpm for 30 seconds using a propellerless planetary centrifugal stirring defoaming apparatus (VMX-N360 manufactured by EME Corporation), and thereafter, kneading is performed using three rolls (80S manufactured by EXAKT, Inc.) by allowing the mixture to pass through a roll gap from 100 μm to 20 μm, whereby an electrically conductive paste (silver paste) is obtained. After the production, the viscosity is measured and adjusted to 300 Pa·s with BCA when measured at a cone rotation speed of 1 rpm using a viscometer (DV-3 manufactured by Brookfield, CP-52 cone) (the viscosity after 5 minutes was measured at 25° C.).

[Screen Printing]

With respect to the electrically conductive paste obtained by the above procedure, a line pattern having a width of 500 µm and a length of 37.5 mm was printed using a screen printer (MT-320T manufactured by Microtech, Inc.) under the condition of a squeegee pressure of 0.18 MPa, whereby a film of the electrically conductive paste is formed. The obtained film is cured by heating at 200° C. for 30 minutes using an air circulation-type dryer, thereby forming an electrically conductive film. With respect to each of the obtained electrically conductive films, the average thickness of the electrically conductive film is determined by measuring a level difference between a portion where a film was not printed and a portion of the electrically conductive film on an aluminum substrate using a surface roughness meter (Surfcom 480B-12 manufactured by Tokyo Seimitsu Co., Ltd.). On the other hand, the resistance value of each of the electrically conductive films is measured using a digital multimeter (R6551 manufactured by Advantest Corporation). The volume of the electrically conductive film is determined from the size (film thickness, width, and length) of the electrically conductive film, and the volume resistivity is determined from this volume and the measured resistance value.

EXAMPLES

Comparative Example 1

Pure water was added to 5 g of a stearic acid emulsion (Selosol 920 manufactured by Chukyo Yushi Co., Ltd., containing 82% of water), which is an example of a commercially available emulsion, and the total liquid amount was brought to 50 mL in accordance with the dilution ratio in the production of a silver powder described later (diluted 10 times), and the particle size distribution of micelles contained in the emulsion was measured using Microtrac MT3300 EXII manufactured by Nikkiso Co., Ltd. The measurement result of the particle size distribution is shown in FIG. 1.

The micelles contained in the emulsion diluted 10 times had a volume-based cumulative 10% particle diameter $D_{10}$ of 0.8 µm, a cumulative 50% particle diameter $D_{50}$ of 4.0 µm, and a cumulative 90% particle diameter $D_{90}$ of 9.8 µm. The measurement results are shown in Table 1.

To 3,375 g of a silver nitrate aqueous solution containing 45.3 g of silver, 3.3 g of a 60% nitric acid aqueous solution was added, and 76.5 g of industrial ammonia water at a concentration of 28 mass % (corresponding to 1.5 molar equivalents of ammonia per mole of silver) was added, whereby a silver-ammine complex aqueous solution was obtained. After the liquid temperature of this silver-ammine complex aqueous solution was adjusted to 35° C., while stirring the silver-ammine complex aqueous solution, a sodium benzotriazole aqueous solution was added thereto so that sodium benzotriazole is contained in an amount of 0.5 mass % with respect to silver. After stirring, an aqueous solution prepared by diluting 12.5 g of hydrous hydrazine having a concentration of 80 mass % with 130.2 g of pure water was added thereto to reduce the silver-ammine complex, thereby obtaining a slurry containing silver particles. Further, to the obtained slurry containing silver particles, 17.54 g of the stearic acid emulsion diluted 10 times was added, and then stirring was stopped to allow the surface-treated silver particles to settle. The liquid in which the silver particles were precipitated was filtered, and the silver particles were washed with water until the electrical conductance of the liquid after passing therethrough reached 0.2 mS/m or less, and vacuum-dried at 73° C. Then, after crushing was performed using a sample mill SK-M10 manufactured by Kyoritsu Riko Co., Ltd., a 10 mass % adipic acid ethanol solution was added thereto so that the amount of adipic acid with respect to the silver powder was 0.07 mass %. Then, mixing was performed twice for 45 seconds using a sample mill SK-M10 manufactured by Kyoritsu Riko Co., Ltd. so that the added adipic acid ethanol solution was uniformly mixed with 120 g of the silver powder to further coat the silver powder coated with the surface treatment agent using the stearic acid emulsion with adipic acid, whereby a silver powder according to Comparative Example 1 was obtained. With respect to the obtained silver powder, a particle size distribution and a specific surface area were measured. Then, a silver paste was produced and a volume resistivity was measured as described above. The measurement results are shown in Table 2.

Example 1

5 g of the above-mentioned commercially available stearic acid emulsion was dispensed in a 100 mL beaker, which was placed in a hot water bath (constant temperature water tank) and heated to 62.8° C. As a result, gradual generation of white solids was observed. This is because the cloud point of the emulsifier contained in Selosol is 60° C. The surface treatment agent contained in the commercially available stearic acid emulsion contains stearic acid (melting point: 69.6° C.) and palmitic acid (melting point: 62.9° C.), which are fatty acids, and because heating was performed at a temperature lower than the melting points of the fatty acids, the bonds between each of these fatty acids and the surfactant were cleaved, and the white solids coagulated. It is considered that a white suspension is a suspension containing a surfactant that covered the surfaces of the fatty acids when forming micelles, and solids that are the fatty acids, and water that is the solvent. Generation of white solids in the white suspension no longer occurred within 2 minutes of heating, and therefore, the suspension was maintained in this state for 5 minutes.

Thereafter, stearic acid and palmitic acid turned into white solids were melted and formed into oil droplets by heating to 95° C. on a heater. To the white suspension in a state where the oil droplets of the fatty acids floated, 10 mL of boiling water was added using a pipette, and then, boiling water was added thereto until the total liquid amount reached 50 mL. Thereafter, the beaker was transferred to a hot water bath (constant temperature water tank) at 80° C., and the contents of the beaker were stirred at 10,000 rpm for 1.5 minutes using the homogenizer, and then cooled to room temperature by removing the beaker from the hot water bath and allowing it to cool for 6 hours, whereby an emulsion of Example 1 was obtained. The result of measuring the particle size distribution of the micelles contained in the obtained emulsion is shown in FIG. 1. Note that, in FIG. 1, the measurement result of Comparative Example 1 is also shown for comparison.

The micelles in Example 1 had a volume-based cumulative 10% particle diameter $D_{10}$ of 0.1 µm, a volume-based cumulative 50% particle diameter $D_{50}$ of 0.2 µm, and a cumulative 90% particle diameter $D_{90}$ of 0.5 µm, and a micronized emulsion was obtained. The measurement results are shown in Table 1. With respect to the emulsion, the particle size distribution was measured two weeks after preparation, and the particle size distribution remained almost unchanged.

A silver powder according to Example 1 was obtained in the same manner as in Comparative Example 1 except that a 17.54 g portion was separated from the emulsion obtained by the above-mentioned procedure and used. With respect to the obtained silver powder, a particle size distribution and a specific surface area were measured. Then, a silver paste was produced and a volume resistivity was measured as described above. The measurement results are shown in Table 2.

Comparative Example 2

1.75 g of oleic acid (NAA-34 manufactured by NOF Corporation) which is a surface treatment agent and 0.525 g of a surfactant (EMULGEN 350 manufactured by Kao Corporation) were dispensed in a 100 mL beaker and heated to about 80° C. to melt the surfactant. Boiling water was added thereto until the total liquid amount reached 50 mL, and the contents of the beaker were stirred at 3,000 rpm for 1.5 minutes using a biomixer (model: BM-4) manufactured by Nihonseiki Kaisha, Ltd., and then cooled to room temperature, whereby an oleic acid emulsion in which the $D_{50}$ of micelles is 4.00 μm was obtained. The result of measuring the particle size distribution of the micelles contained in the obtained emulsion is shown in FIG. 2.

The micelles in Comparative Example 2 had a volume-based cumulative 10% particle diameter $D_{10}$ of 1.26 μm, a cumulative 50% particle diameter $D_{50}$ of 4.00 μm, and a cumulative 90% particle diameter $D_{90}$ of 10.1 μm. The measurement results are shown in Table 1.

A silver powder according to Comparative Example 2 was obtained in the same manner as in Comparative Example 1 except that the stearic acid emulsion diluted 10 times was not used, but 7.77 g of the oleic acid emulsion was used instead, and the 60% nitric acid aqueous solution was not added. With respect to the obtained silver powder, a particle size distribution and a specific surface area were measured. Then, a silver paste was produced and a volume resistivity was measured as described above. The measurement results are shown in Table 2.

Example 2

An oleic acid emulsion in which the $D_{50}$ of micelles is 0.15 μm was obtained in the same manner as in Comparative Example 2 except that the stirring conditions of the biomixer were set to 10,000 rpm and 1.5 minutes. The result of measuring the particle size distribution of the micelles contained in the obtained emulsion is shown in FIG. 2. Note that, in FIG. 2, the measurement result of Comparative Example 2 is also shown for comparison.

The micelles in Example 2 had a volume-based cumulative 10% particle diameter $D_{10}$ of 0.09 μm, a volume-based cumulative 50% particle diameter $D_{50}$ of 0.15 μm, and a cumulative 90% particle diameter $D_{90}$ of 0.27 μm, and a micronized emulsion was obtained. The measurement results are shown in Table 1. With respect to the emulsion, the particle size distribution was measured two weeks after preparation, and the particle size distribution remained almost unchanged.

A silver powder according to Example 2 was obtained in the same manner as in Comparative Example 2 except that the emulsion obtained by the above-mentioned procedure was used. With respect to the obtained silver powder, a particle size distribution and a specific surface area were measured. Then, a silver paste was produced and a volume resistivity was measured as described above. The measurement results are shown in Table 2.

Comparative Example 3

1.75 g of linoleic acid (manufactured by FUJIFILM Wako Pure Chemical Corporation, purity: 88 mass %) which is a surface treatment agent and 0.525 g of a surfactant (EMULGEN 350 manufactured by Kao Corporation) were dispensed in a 100 mL beaker and heated to about 80° C. to melt the surfactant. Boiling water was added thereto until the total liquid amount reached 50 mL, and the contents of the beaker were stirred at 3,000 rpm for 1.5 minutes using a biomixer (model: BM-4) manufactured by Nihonseiki Kaisha, Ltd., and then cooled to room temperature, whereby a linoleic acid emulsion in which the $D_{50}$ of micelles is 3.1 μm was obtained. The result of measuring the particle size distribution of the micelles contained in the obtained emulsion is shown in FIG. 3.

The micelles in the emulsion in Comparative Example 3 had a volume-based cumulative 10% particle diameter $D_{10}$ of 0.97 μm, a cumulative 50% particle diameter $D_{50}$ of 3.1 μm, and a cumulative 90% particle diameter $D_{90}$ of 10.1 μm. The measurement results are shown in Table 1.

A silver powder according to Comparative Example 3 was obtained in the same manner as in Comparative Example 1 except that the stearic acid emulsion diluted 10 times was not used, but 8.83 g of the linoleic acid emulsion was used instead, and the 60% nitric acid aqueous solution was not added. With respect to the obtained silver powder, a particle size distribution and a specific surface area were measured. Then, a silver paste was produced and a volume resistivity was measured as described above. The measurement results are shown in Table 2.

Example 3

A linoleic acid emulsion in which the $D_{50}$ of micelles is 0.15 μm was obtained in the same manner as in Comparative Example 3 except that the stirring conditions of the biomixer were set to 10,000 rpm and 1.5 minutes. The result of measuring the particle size distribution of the micelles contained in the obtained emulsion is shown in FIG. 3. Note that, in FIG. 3, the measurement result of Comparative Example 3 is also shown for comparison.

The micelles in Example 3 had a volume-based cumulative 10% particle diameter $D_{10}$ of 0.09 μm, a volume-based cumulative 50% particle diameter $D_{50}$ of 0.15 μm, and a cumulative 90% particle diameter $D_{90}$ of 0.24 μm, and a micronized emulsion was obtained. The measurement results are shown in Table 1. With respect to the emulsion, the particle size distribution was measured two weeks after preparation, and the particle size distribution remained almost unchanged.

A silver powder according to Example 3 was obtained in the same manner as in Comparative Example 3 except that the emulsion obtained by the above-mentioned procedure was used. With respect to the obtained silver powder, a particle size distribution and a specific surface area were measured. Then, a silver paste was produced and a volume resistivity was measured as described above. The measurement results are shown in Table 2.

TABLE 1

| | Emulsion Surface treatment agent | Volume-based cumulative particle diameter of micelles | | |
|---|---|---|---|---|
| | | $D_{10}$ (μm) | $D_{50}$ (μm) | $D_{90}$ (μm) |
| Comparative Example 1 | stearic acid | 0.80 | 4.00 | 9.80 |
| Example 1 | stearic acid | 0.10 | 0.20 | 0.50 |
| Comparative Example 2 | oleic acid | 1.26 | 4.00 | 10.1 |
| Example 2 | oleic acid | 0.09 | 0.15 | 0.27 |
| Comparative Example 3 | linoleic acid | 0.97 | 3.10 | 10.1 |
| Example 3 | linoleic acid | 0.09 | 0.15 | 0.24 |

TABLE 2

| | Emulsion Surface treatment agent | Particle diameter of silver powder | | | | Specific surface area ($m^2$/g) | Volume resistivity (μΩ · cm) |
|---|---|---|---|---|---|---|---|
| | | $D_{50}$ (μm) | $D_{10}$ (μm) | $D_{50}$ (μm) | $D_{90}$ (μm) | | |
| Comparative Example 1 | stearic acid | 4.00 | 0.14 | 0.47 | 0.92 | 1.79 | 22.7 |
| Example 1 | stearic acid | 0.20 | 0.14 | 0.48 | 1.05 | 1.67 | 18.9 |
| Comparative Example 2 | oleic acid | 4.00 | 0.15 | 0.47 | 0.95 | 1.69 | 15.0 |
| Example 2 | oleic acid | 0.15 | 0.18 | 0.54 | 1.07 | 1.47 | 12.7 |
| Comparative Example 3 | linoleic acid | 3.10 | 0.17 | 0.50 | 0.98 | 1.70 | 6.5 |
| Example 3 | linoleic acid | 0.15 | 0.16 | 0.50 | 0.97 | 1.83 | 6.3 |

From the above results, it is found that the silver powders obtained through the step of coating with a polyvalent carboxylic acid after producing a silver powder using an O/W-type emulsion containing micelles of a surface treatment agent having a cumulative 50% particle diameter $D_{50}$ of 1.5 μm or less of the invention in Examples 1 to 3 enable a low resistance when each of the obtained silver powders is made into a paste to form an electrode.

Silver powders were obtained in the same manner as in Comparative Example 1 and Example 1 except that in Comparative Example 1 and Example 1, the adipic acid ethanol solution was not added, and mixing of the adipic acid ethanol solution using a sample mill SK-M10 was not performed, and the volume resistivity of the electrically conductive film was investigated. As a result, in Comparative Example 1, the volume resistivity was 28.5 μΩ·cm when adipic acid was not added, but decreased to 22.7 μΩ·cm in Comparative Example 1 with the addition of adipic acid. Further, in Example 1, the volume resistivity was 21.4 μΩ·cm when adipic acid was not added, but decreased to 18.9 μΩ·cm in Example 1 with the addition of adipic acid. That is, it was found that the volume resistivity value is smaller when adipic acid is added than when adipic acid is not added.

TABLE 3

| | Volume resistivity (μΩ · cm) | |
|---|---|---|
| | Without adipic acid | With adipic acid |
| Comparative Example 1 | 28.5 | 22.7 |
| Example 1 | 21.4 | 18.9 |

The invention claimed is:

1. A method for producing a silver powder, in which silver ions are converted into a silver complex with a complexing agent and the silver complex is reduced, thereby obtaining a silver powder, comprising:
   a silver complexing step of forming a silver-ammine complex aqueous solution using ammonium ions as the complexing agent for complexing the silver ions;
   a reduction step of reducing the silver complex with a reducing agent by adding the reducing agent to the aqueous solution containing the silver complex, thereby obtaining a slurry of a silver powder;
   an emulsion addition step of adding an O/W-type emulsion containing micelles of a surface treatment agent having a volume-based cumulative 50% particle diameter $D_{50}$ obtained by a laser diffraction particle size distribution analysis of 1.5 μm or less to the slurry of the silver powder, thereby treating the surface of the silver powder; and
   a carboxylic acid coating step of coating the silver powder coated with the surface treatment agent in the emulsion addition step with a polyvalent carboxylic acid.

2. The method for producing a silver powder according to claim 1, wherein the polyvalent carboxylic acid is one type or two or more types selected from adipic acid, succinic acid, diglycolic acid, glutaric acid, and maleic acid.

3. The method for producing a silver powder according to claim 1, wherein the surface treatment agent contained in the emulsion is a fatty acid having 8 or more carbon atoms in a straight chain.

4. The method for producing a silver powder according to claim 3, wherein the surface treatment agent contained in the emulsion is a long-chain fatty acid having 12 or more carbon atoms.

5. The method for producing a silver powder according to claim 4, wherein the surface treatment agent contained in the emulsion is one type or two types selected from palmitic acid and stearic acid.

6. The method for producing a silver powder according to claim 4, wherein the surface treatment agent contained in the emulsion is one type or two types selected from linoleic acid and linolenic acid.

* * * * *